(12) United States Patent
Coult et al.

(10) Patent No.: US 6,210,546 B1
(45) Date of Patent: Apr. 3, 2001

(54) FIXTURE WITH AT LEAST ONE TROUGH AND METHOD OF USING THE FIXTURE IN A PLASMA OR ION BEAM

(75) Inventors: David G. Coult, Oley, PA (US); Gustav E. Derkits, Jr., New Providence, NJ (US); Walter J. Shakespeare, Macungie, PA (US); Duane D. Wendling, Kutztown, PA (US); Frederick A. Yeagle, Leesport, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/182,722

(22) Filed: Oct. 29, 1998

(51) Int. Cl.[7] .......................... C23C 14/46; C23C 14/50; C23F 1/00

(52) U.S. Cl. .................. 204/192.32; 204/298.15; 204/192.12; 204/192.11; 204/192.34; 118/728; 118/500; 216/66; 216/67

(58) Field of Search ..................... 204/192.11, 192.12, 204/192.15, 192.26, 192.32, 192.34, 298.15; 118/728, 732, 500; 156/345; 427/525, 527, 569, 162, 166; 216/24, 25, 26, 67, 66

(56) References Cited

U.S. PATENT DOCUMENTS

| | | | |
|---|---|---|---|
| 2,391,595 | * 12/1945 | Richards et al. | 427/166 |
| 2,398,382 | * 4/1946 | Lyon | 427/166 |
| 3,653,900 | * 4/1972 | Black | 216/25 |
| 3,708,418 | 1/1973 | Quinn | 204/298.37 |
| 3,998,718 | 12/1976 | Melliar-Smith | 204/298.35 |
| 4,126,530 | 11/1978 | Thornton | 204/192.3 |
| 4,245,768 | 1/1981 | Sater | 228/116 |
| 4,278,493 | 7/1981 | Petvai | 204/192.32 |
| 5,090,609 | 2/1992 | Nakao et al. | 228/123.1 |
| 5,376,180 | * 12/1994 | Maher | 156/345 |
| 5,380,551 | * 1/1995 | Blonder et al. | 427/166 |
| 5,737,349 | 4/1998 | Gaebe | 372/37 |
| 6,017,581 | * 1/2000 | Hooker et al. | 427/166 |

* cited by examiner

Primary Examiner—Nam Nguyen
Assistant Examiner—Gregg Cantelmo
(74) Attorney, Agent, or Firm—Steve Mendelsohn

(57) ABSTRACT

Optical components, such as optical semi-isolators, are placed in a fixture that exposes at least a portion of the mounting surface of each optical component when a plasma or ion beam is directed at one side of the fixture, while shielding sensitive surfaces of the optical components (e.g., an optical element mounted within the frame of the optical component) from direct exposure to the plasma or ion beam. Exposure to the plasma or ion beam removes contaminants (e.g., metal oxide) that form on the mounting surface during the fabrication of the optical components when the optical element is mounted within its frame using glass solder in a heated oxygenated environment (e.g., air). By removing enough of the contaminants, the plasma or ion beam cleaning step produces optical components that can be reliably mounted onto substrates, such as the ceramic substrates used in encapsulated laser packages, using flux-less auto-bonding techniques.

18 Claims, 2 Drawing Sheets

FIXTURE WITH AT LEAST ONE TROUGH AND METHOD OF USING THE FIXTURE IN A PLASMA OR ION BEAM

BACKGROUND OF THE INVENTION

1. Field of the Invention

The present invention relates to optical components, and, in particular, to the manufacture of optical components used in laser-based optical communication systems.

2. Description of the Related Art

In a laser-based optical communication system, light is transmitted from a laser source (which converts electrical signals into optical signals) to an optical receiver (which converts the optical signals back into electrical signals) over optical fibers and through various types of optical components that modulate, filter, route, amplify, or otherwise process the optical signals. Two or more optical components may be aligned and mounted onto a substrate for an encapsulated laser package to be used in an optical communication system. One such component is an optical semi-isolator, which may be used in conjunction with an optical analyzer to form an optical isolator. Optical semi-isolators are described in more detail in U.S. Pat. No. 5,737,349.

FIG. 1 shows a cross-sectional view of a typical optical semi-isolator 100. Semi-isolator 100 is formed from two parts: a polarizer 102 and a rotator 104, each of which has an optical element mounted 20 within a frame. In particular, polarizer 102 comprises glass element 106 having an anti-reflection coating and mounted within frame 108, while rotator 104 comprises garnet element 110 having an anti-reflection coating and mounted within frame 112. Frames 108 and 112 are typically gold-coated metal structures. For example, in one implementation, frames 108 and 112 are iron-nickel (Fe—Ni) structures coated with nickel/gold (Ni/Au) plating 114.

Fabrication of semi-isolator 100 involves the following steps:

(1) Apply anti-reflection coatings to glass element 106 and garnet element 110;

(2) Insert glass element 106 into frame 108 and insert garnet element 110 into frame 112;

(3) Solder elements 106 and 110 within frames 108 and 112, respectively, using solder glass 116 at about 500° C. in air to form polarizer 102 and rotator 104; and (4) Laser weld (118) frame 108 of polarizer 102 to frame 112 of rotator 104 to form semi-isolator 100.

Semi-isolator 100 may then be mounted onto a substrate to form one component of a laser package for use in an optical communication system. In particular, components like semi-isolator 100 are often auto-bonded to a ceramic substrate using a tin-lead (Sn-Pb) solder without using any flux. The ability to mount optical components like semi-isolators onto substrates without using any flux is important in applications where flux would adversely affect the operational characteristics of the optical elements (e.g., contaminate or otherwise interact with the surfaces of the optical elements).

Unfortunately, however, it has been found that optical components, such as semi-isolator 100 of FIG. 1, that are fabricated using a process similar to the one outlined above, cannot be mounted onto ceramic substrates with sufficient reliability using flux-less auto-bonding techniques. The strength of such bonding is often too low to withstand normal operational conditions (e.g., vibrations and temperature variations). As a result, an unacceptably high percentage of such optical components come loose from their substrates, thereby destroying the desired functionality of those laser packages.

SUMMARY OF THE INVENTION

The present invention is directed to a technique for manufacturing optical components, such as optical semi-isolator 100 of FIG. 1, such that the resulting optical components can be reliably mounted onto substrates using flux-less auto-bonding. According to the technique of the present invention, one or more optical components are placed within a special fixture that allows certain portions of the optical components (e.g., surface 120 of semi-isolator 100 of FIG. 1) to be exposed to a plasma or ion beam directed at the components, while shielding other, sensitive portions of the optical components (e.g., the optical elements 106 and 110 of FIG. 1) from such exposure.

In one embodiment, the present invention is a fixture used in fabricating an optical component having at least one optical element and a mounting surface. The fixture comprises one or more troughs defined on a first side of the fixture, each trough adapted to receive one or more optical components. Each trough has opposing shelves adapted to support the one or more optical components. The shelves define an aperture in the trough such that, when the optical component is placed within a trough, at least a portion of the mounting surface of the optical component will be exposed when a plasma or ion beam is directed at the optical component from a second side of the fixture, while the shelves shield the optical element in the optical component from direct exposure to the plasma or ion beam.

In another embodiment, the present invention is a method for fabricating an optical component having at least one optical element and a mounting surface, comprising the steps of (a) placing the optical component within a fixture comprising one or more troughs defined on a first side of the fixture, each trough adapted to receive one or more optical components, each trough having opposing shelves adapted to support the one or more optical components, the shelves defining an aperture in the trough; and (b) directing a plasma or ion beam at a second side of the fixture, wherein the aperture in the trough exposes at least a portion of the mounting surface of the optical component to the plasma or ion beam and the shelves shield the optical element in the optical component from direct exposure to the plasma or ion beam.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
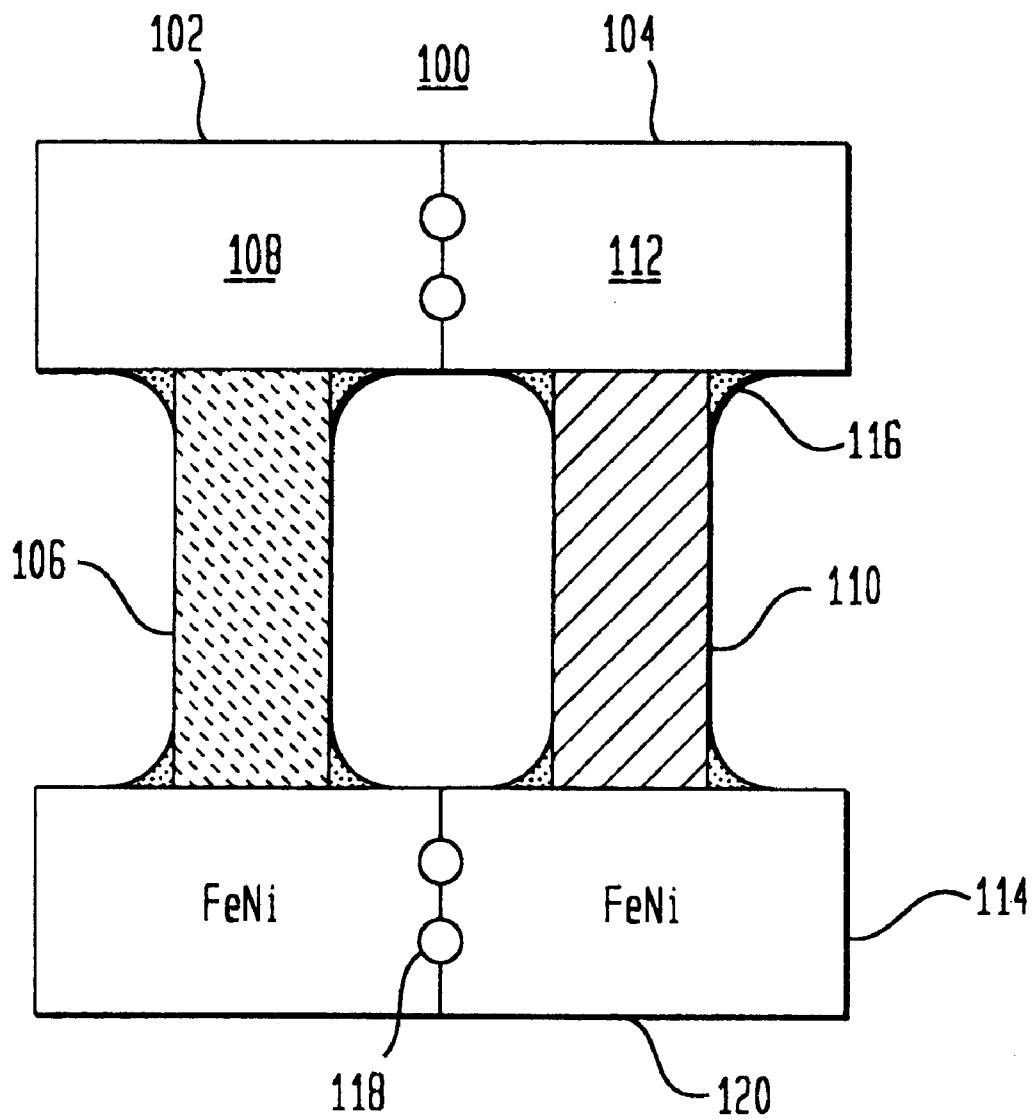
FIG. 1 shows a cross-sectional view of a typical optical semi-isolator.

The inventors have discovered that, when optical components, such as optical semi-isolator 100 of FIG. 1, are fabricated using the procedure outlined earlier in the Description of the Related Art, nickel from the iron-nickel frame reacts with oxygen during glass soldering (Step 3) to form nickel oxide on the outer surface of the frame. This nickel oxide inhibits the ability of a good solder bond to be formed between the optical component and a ceramic substrate during flux-less auto-bonding with a tin-lead solder.

According to the present invention, after manufacture of an optical component using the earlier-described procedure, but before the component is mounted onto a substrate, at least some portion of the mounting surface of the optical component (i.e., the surface that will face the substrate) is exposed to a plasma or ion beam that removes enough of the nickel oxide to enable reliable bonding of the optical component to the substrate using flux-less auto-bonding.

Figure 2A:
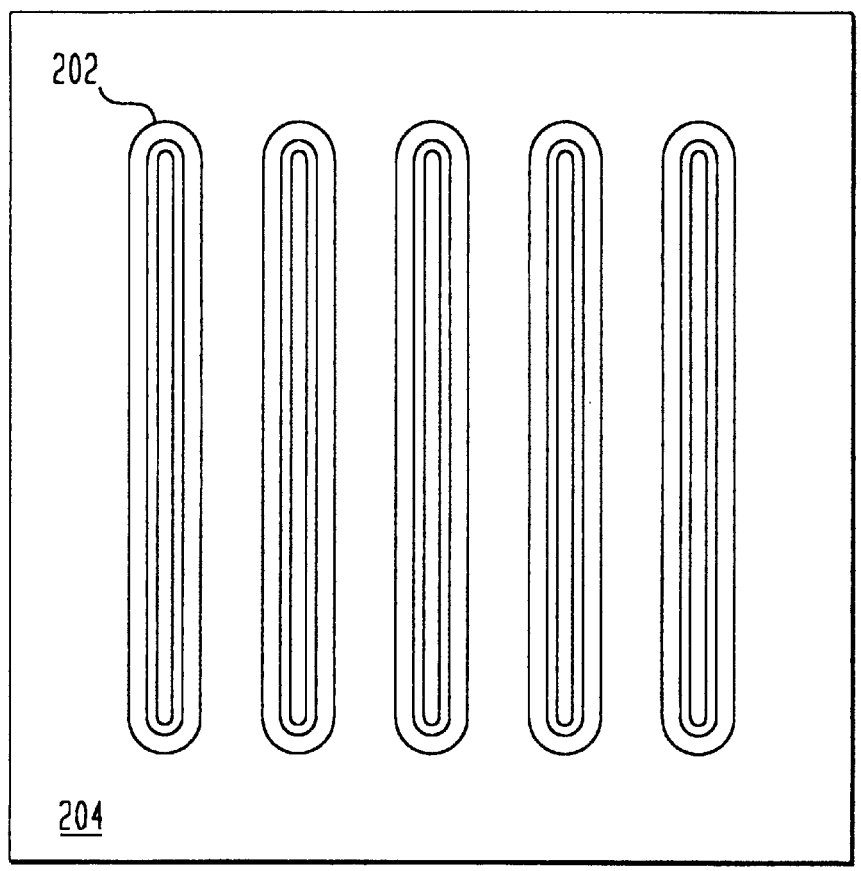
FIGS. 2A and 2B show a top view and a cross-sectional side view, respectively, of a fixture used to hold optical components for plasma or ion beam cleaning, according to one embodiment of the present invention.
Figure 2B:
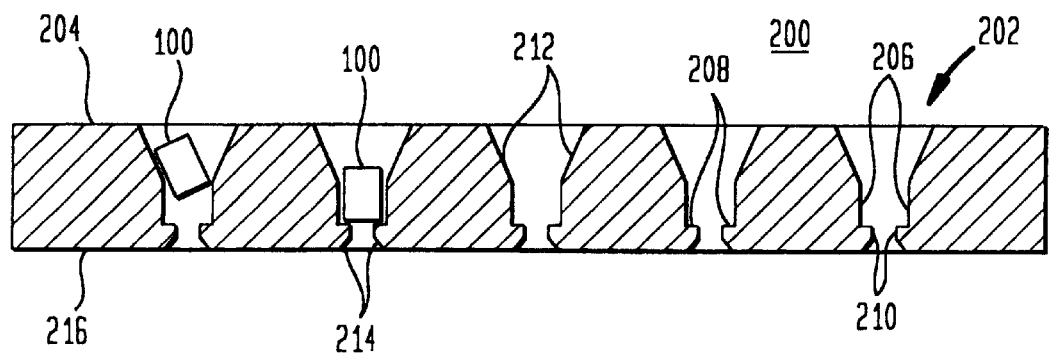

FIGS. 2A and 2B show a top view and a cross-sectional side view, respectively, of a fixture 200 used to hold optical components for plasma or ion beam cleaning, according to one embodiment of the present invention. According to this embodiment, fixture 200 has a plurality of troughs 202 defined on a first side 204 of the fixture. Each trough 202 is adapted to receive a plurality of optical components, such as optical semi-isolator 100 of FIG. 1.

In particular, each trough 202 has opposing shelves formed by side walls 206 that are substantially mutually parallel and bases 208 that are substantially mutually co-planar. Each trough 202 has an aperture defined by aperture walls 210 that are substantially mutually parallel and closer together than the side walls 206 of the corresponding shelves. In addition, for each trough 202, the shelves have funnel-shaped tops 212 on the first side 204 of the fixture that converge to the side walls 206, and the aperture is further defined by funnel-shaped bottoms 214 on a second side 216 of the fixture that converge to the aperture walls 210.

FIG. 2B shows an optical component, such as optical semi-isolator 100 of FIG. 1, placed within a trough 202 of fixture 200 of FIGS. 2A-B. As shown, the optical component is supported by bases 208 and held in place by side walls 206. When a plasma or ion beam is directed at the second side 216 of fixture 200, the aperture in trough 202 exposes a portion of the mounting surface of the optical component to the plasma or ion beam, while the shelves defined in trough 202 shield the optical elements within optical component from direct exposure to the plasma or ion beam.

In one implementation, 32 fixtures, each capable of holding 50 optical components, may be placed within a four-wheel planetary drive mechanism in a vacuum system with a 2.5-cm ion source manufactured by Ion Tech of Fort Collins, Colo., and exposed to an argon ion beam having an ion energy from about 800 eV to about 1500 eV and a beam current of about 40 mA with an accelerator current of about 3 mA at about 350 V, a discharge current of about 0.8 A at about 50 V, at a vacuum of about $3 \times 10^{31\ 4}$ torr, and located about 6 to about 10 inches from the ion beam source for about 90 minutes. The resultant ion beam cleaning removes enough of the nickel oxide from the exposed portion of the mounting surface to enable reliable mounting of the optical components onto a ceramic substrate using flux-less auto-bonding, without damaging the optical elements mounted within the frames of the optical components. Those skilled in the art will understand that, in other implementations, other suitable types of plasma or ion beam cleaning may be used to remove contaminants from the mounting surface of the optical components, including the use of ion beam constituents other than argon.

The quality of the solder bond was measured using a Model 6-092-02 Micropull pushoff tester made by Unitek. The average pushoff without implementing the cleaning of the present invention was 2.63 Kg with a minimum of 0.48 Kg. This is unacceptably low, especially the low minimum. With implementation of the invention, the average pushoff was 5.60 Kg with a minimum of 4.95 Kg, which is acceptable. With the invention, no semi-isolators fell off during manufacturing, and yields rose to 100% at this step.

Although the present invention has been described in the context of a particular type of optical semi-isolator that is auto-bonded onto a ceramic substrate using a flux-less tin-lead solder, it will be understood that the present invention can be applied to other types of optical components, other types of substrates, and/or other types of bonding techniques.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A fixture used in fabricating one or more optical components, each having at least one optical element and a mounting surface, the fixture comprising one or more troughs defined on a first side of the fixture, each trough adapted to receive at least one of the one or more optical components, each trough having opposing shelves adapted to support the at least one of the one or more optical components, the shelves defining an aperture in each trough such that, when each optical component is placed within a trough, at least a portion of the mounting surface of said each optical component will be exposed when a plasma or ion beam is directed at said each optical component from a second side of the fixture, while the shelves shield the at least one optical element in said each optical component from direct exposure to the plasma or ion beam, wherein, for each trough:

the shelves have side walls that are substantially mutually parallel and bases that are substantially mutually co-planar; and the aperture is defined by aperture walls that are substantially mutually parallel and closer together than the side walls of the shelves.

2. The invention of claim 1, wherein said each optical component is an optical semi-isolator and each trough is adapted to receive a plurality of optical semi-isolators.

3. The invention of claim 1, wherein, for each trough, the shelves also have funnel-shaped tops on the first side of the fixture that converge to the side walls.

4. The invention of claim 1, wherein, for each trough, the aperture is further defined by funnel-shaped bottoms on the second side of the fixture that converge to the aperture walls.

5. The invention of claim 4, wherein, for each trough, the shelves also have funnel-shaped tops on the first side of the fixture that converge to the side walls.

6. The invention of claim 5, wherein each trough is adapted to receive a plurality of optical semi-isolators.

7. A method for fabricating one or more optical components, each having at least one optical element and a mounting surface, comprising the steps of:

(a) placing each optical component within a trough of a fixture comprising one or more troughs defined on a first side of the fixture, each trough adapted to receive at least one of the one or more optical components, each trough having opposing shelves adapted to support the at least one of the one or more optical components, the shelves defining an aperture in each trough; and (b) directing a plasma or ion beam at a second side of the fixture, wherein the aperture in the trough holding said each optical component exposes at least a portion of the mounting surface of said each optical component to the plasma or ion beam and the shelves shield the at least one optical element in said each optical component from direct exposure to the plasma or ion beam.

8. The invention of claim 7, wherein said each optical component is an optical semi-isolator and step (a) comprises the step of placing a plurality of optical semi-isolators within each trough.

9. The invention of claim 7, wherein, for each trough:
the shelves have side walls that are substantially mutually parallel and bases that are substantially mutually co-planar; and
the aperture is defined by aperture walls that are substantially mutually parallel and closer together than the side walls of the shelves.

10. The invention of claim 9, wherein, for each trough, the shelves also have funnel-shaped tops on the first side of the fixture that converge to the side walls.

11. The invention of claim 9, wherein, for each trough, the aperture is further defined by funnel-shaped bottoms on the second side of the fixture that converge to the aperture walls.

12. The invention of claim 11, wherein, for each trough, the shelves also have funnel-shaped tops on the first side of the fixture that converge to the side walls.

13. The invention of claim 7, wherein step (a) further comprises the step of mounting the at least one optical element within a frame using solder glass to form said each optical component.

14. The invention of claim 13, wherein the at least one optical element and frame are heated in air to mount the at least one optical element within the frame using the solder glass.

15. The invention of claim 7, wherein exposing said each optical component to the plasma or ion beam removes contaminants from the at least a portion of the mounting surface of said each optical component.

16. The invention of claim 15, wherein the contaminants include a metal oxide formed during fabrication of said each optical component.

17. The invention of claim 7, further comprising the step of soldering said each optical component onto a substrate without using any flux, after exposing said each optical component to the plasma or ion beam.

18. The invention of claim 17, wherein the soldering step comprises the step of auto-bonding said each optical component onto a ceramic substrate using a fluxless tin-lead solder.

* * * * *